US011994094B2

(12) United States Patent
Mathers

(10) Patent No.: US 11,994,094 B2
(45) Date of Patent: May 28, 2024

(54) HYDRAULIC DEVICE CONFIGURED AS A STARTER MOTOR

(71) Applicant: Mathers Hydraulics Technologies Pty Ltd, Bridgeman Downs (AU)

(72) Inventor: Norman Ian Mathers, Brisbane (AU)

(73) Assignee: Mathers Hydraulics Technologies Pty Ltd, Bridgeman Downs (AU)

( * ) Notice: Subject to any disclaimer, the term of this patent is extended or adjusted under 35 U.S.C. 154(b) by 53 days.

(21) Appl. No.: 17/783,172

(22) PCT Filed: Dec. 9, 2020

(86) PCT No.: PCT/AU2020/051342
§ 371 (c)(1),
(2) Date: Jun. 7, 2022

(87) PCT Pub. No.: WO2021/113907
PCT Pub. Date: Jun. 17, 2021

(65) Prior Publication Data

US 2023/0008105 A1 Jan. 12, 2023

Related U.S. Application Data

(60) Provisional application No. 62/945,946, filed on Dec. 10, 2019.

(51) Int. Cl.
*F02N 7/08* (2006.01)
*F01C 21/08* (2006.01)
(Continued)

(52) U.S. Cl.
CPC ............ *F02N 7/08* (2013.01); *F01C 21/0827* (2013.01); *F02N 7/00* (2013.01); *F04C 14/06* (2013.01);
(Continued)

(58) Field of Classification Search
CPC .......... F02N 7/08; F02N 7/00; F01C 21/0827; F04C 14/06; F04C 15/06; F04C 2240/10; F04C 2240/30; F04C 2/3447; F03C 2/304
(Continued)

(56) References Cited

U.S. PATENT DOCUMENTS 3,255,705 A 6/1966 Karl
5,267,840 A 12/1993 Snow et al.
(Continued)

FOREIGN PATENT DOCUMENTS

DE 102015217169 A1 3/2017

OTHER PUBLICATIONS

"International Application Serial No. PCT/AU2020/051342, International Search Report dated Feb. 18, 2021", 4 pgs.
(Continued)

*Primary Examiner* — Hai H Huynh
(74) *Attorney, Agent, or Firm* — Schwegman Lundberg & Woessner, P.A.

(57) ABSTRACT

A hydraulic device is disclosed. The hydraulic device can include a rotor, a plurality of vanes and a ring. The ring can include a suction cavity and a pressure cavity. The suction cavity and pressure cavity can be configured for ingress and egress of a hydraulic fluid through the ring. The ring can include a suction port defined entirely by the ring and in fluid communication with the suction cavity. The suction port can be configured to receive hydraulic fluid from a first region between the ring and the rotor. The ring can include a pressure port defined entirely by the ring and in fluid communication with the pressure cavity. The pressure port can be configured to allow for passage of the hydraulic fluid from the pressure cavity to a second region between the ring and the rotor.

20 Claims, 13 Drawing Sheets

(51) Int. Cl.
*F02N 7/00* (2006.01)
*F04C 14/06* (2006.01)
*F04C 15/06* (2006.01)

(52) U.S. Cl.
CPC .......... *F04C 15/06* (2013.01); *F04C 2240/10* (2013.01); *F04C 2240/30* (2013.01)

(58) Field of Classification Search
USPC .......................................... 123/179.8, 179.31
See application file for complete search history.

(56) References Cited

U.S. PATENT DOCUMENTS

| | | | | |
|---|---|---|---|---|
| 7,056,107 | B2 | 6/2006 | Shinoda et al. | |
| 7,273,360 | B2 | 9/2007 | Shinoda et al. | |
| 7,955,062 | B2 * | 6/2011 | Mathers | F04C 2/3446 418/268 |
| 8,597,002 | B2 * | 12/2013 | Mathers | F01C 21/0863 418/268 |
| 8,708,679 | B2 * | 4/2014 | Mathers | F01C 21/0881 418/268 |
| 9,400,043 | B2 * | 7/2016 | Mathers | F16D 33/00 |
| 9,719,351 | B2 * | 8/2017 | Landrum | F01C 21/0881 |
| 9,759,066 | B2 | 9/2017 | Schevets | |
| 11,255,193 | B2 * | 2/2022 | Mathers | F04C 15/0088 |
| 2006/0133946 | A1 * | 6/2006 | Mathers | F04C 14/06 418/122 |

OTHER PUBLICATIONS

"International Application Serial No. PCT/AU2020/051342, Written Opinion dated Feb. 18, 2021", 8 pgs.

* cited by examiner

HYDRAULIC DEVICE CONFIGURED AS A STARTER MOTOR

CROSS REFERENCE TO RELATED APPLICATIONS

This patent application is a U.S. National Stage Filing under 35 U.S.C. 371 from International Application No. PCT/AU2020/051342, filed Dec. 9, 2020, and published as WO 2021/113907 on Jun. 17, 2021, which application claims the benefit of priority to U.S. Application Ser. No. 62/945,946, filed Dec. 10, 2019, which are incorporated by reference herein in their entirety.

The present application is also related to various patent applications including international application no. PCT/IB2010/003161, entitled "Hydrostatic Torque Converter and Torque Amplifier," filed Nov. 19, 2010; international application no. PCT/AU2007/000772, publication no. WO/2007/140514, entitled "Vane Pump for Pumping Hydraulic Fluid," filed Jun. 1, 2007; international application no. PCT/AU2006/000623, publication no. WO/2006/119574, entitled "Improved Vane Pump," filed May 12, 2006; international application no. PCT/AU2004/00951, publication no. WO/2005/005782, entitled "A Hydraulic Machine," filed Jul. 15, 2004; international application no. PCT/IB2016/000090, entitled "Hydro-Mechanical Transmission With Multiple Modes of Operation," filed Jan. 18, 2016; international application no. PCT/AU2016/000108, entitled "Hydraulic Machine," filed Mar. 24, 2016; international application no. PCT/AU2018/050180, entitled "Hydraulic Machine With Stepped Roller Vane and Fluid Power System Including Hydraulic Machine With Starter Motor Capability," filed Feb. 28, 2018; and U.S. patent application Ser. No. 13/510,643, publication no. U.S. 2013/0067899, entitled "Hydraulically Controlled Rotator Couple," filed Dec. 5, 2012, the entire specification of each of which is incorporated herein by reference in their entirety.

TECHNICAL FIELD

The present patent application relates generally to a hydraulic device, and more particularly, a hydraulic device that is configured as a starter motor.

BACKGROUND

Rotary couplings are utilized in vehicles, industrial machines, and marine applications to transmit rotating mechanical power. For example, they have been used in automobile transmissions as an alternative to a mechanical clutch. Use of rotary couplings is also widespread in applications where variable speed operation and controlled start-up without shock loading of the power transmission system is desired.

SUMMARY OF INVENTION

Various apparatuses, systems and methods are disclosed that can utilize a hydraulic device or a plurality of hydraulic devices. The hydraulic device(s) can be configured to be operable as a starter motor. The hydraulic device(s) can also be configured to be operable as a hydrostatic coupling and as a vane pump.

The present inventor has recognized that traditional torque converters slip when subjected to high torque and low or no travel speed, such as when a backhoe drives forward and uses its bucket to break into a heap of material. Slippage can waste energy, lowering efficiency and creating high heat. Traditional hydrostatic drives are designed to provide a minimum displacement when operating as a pump and a maximum displacement when operating as a motor. Again, such operation characteristics can have low efficiency.

Hydraulic devices utilizing vanes sometimes called hydraulic vane devices, vane pumps or vane couplings have been developed. For simplicity such devices with vanes are simply referred to as hydraulic devices in some instances herein. These devices can offer improved power density and service life as compared to traditional variable piston pump/motor hydraulic devices and indeed even standard vane pumps. However, such hydraulic vane devices are not as compact as is desirable for some vehicle applications. This has been due to the fact that in hydraulic vane devices discharge and suction are end ported via end plates. For balance, the hydraulic vane devices have had at least one (if not more) discharge ports and suction ports at both a first axial end in a first end plate and at a second axial end in a second end plate. The end plates having the ports lead to an overall size of the envelope for the hydraulic vane device being larger than may be desirable for applications where volume such as within an engine bay is limited and a smaller more compact device is desired.

In view of these factors, the present inventors have recognized hydraulic devices that are entirely ported through the ring thereof without having a port (either suction or pressure) in the end plate (sometimes called a side plate herein). Thus, with the design disclosed herein, the presently discussed devices (e.g., hydraulic vane devices that can be operated as a pump, a coupling and a motor such as a starter motor) can be placed in and operated in more compact environments such as engine bays with limited space.

The present inventors have recognized vehicle systems that can use excess energy for hydraulic function and/or to store energy for later use/power regeneration such as for a starter motor application of the hydraulic devices disclosed herein. The efficiency increases provided by the systems can allow lower power rated engines to be used and other benefits. By controlling the torque requirement of the engine such as by using the hydraulic device as a starter motor, the engine management system can have a far better chance of offering fuel efficiency and can reduce fuel usage and emissions. For example, using the hydraulic devices disclosed herein start and stop torques can be reduced to limit high peak torque levels that can damage machinery or cause machinery to operate inefficiently.

According to some examples, the hydraulic device can be part of a system and can allow this system to operate in various operation modes and accessories. These operation modes can include an accessory operation mode, a vehicle idle/drive mode, a regenerative energy storage mode, a regenerative energy application mode, a vane pumping mode and a startup mode. In some cases, the accessories used with the vehicle systems can comprise valves, a hydraulic pump motor, an accumulator, and various vehicle auxiliary systems that are hydraulically operated. Additional examples contemplate that the fluid communicating interior portions of the system including, for example, the plurality of hydraulic devices, the plurality of accessories, and the transmission can be coated in a diamond or diamond-like carbon. This can allow more environmentally friendly hydraulic fluids such as glycol or water-glycol to be used by the system.

As used herein the term "vehicle" means virtually all types of vehicles such as earth moving equipment (e.g., wheel loaders, mini-loaders, backhoes, dump trucks, crane trucks, transit mixers, etc.), waste recovery vehicles, marine vehicles, industrial equipment (e.g., agricultural equipment), personal vehicles, public transportation vehicles, and commercial road vehicles (e.g., heavy road trucks, semi-trucks, etc.).

To further illustrate the apparatuses, systems and/or methods disclosed herein, the following non-limiting examples are provided:

In Example 1, a hydraulic device is disclosed, the hydraulic device can include a rotor, a plurality of vanes and a ring. The rotor can be disposed for rotation about an axis. The plurality of vanes can each be moveable relative to the rotor between a retracted position and an extended position where the plurality of vanes work a hydraulic fluid introduced adjacent the rotor. The ring can be disposed around at least a portion of the rotor. The ring can include a suction cavity and a pressure cavity. The suction cavity and pressure cavity can be configured for ingress and egress of a hydraulic fluid through the ring. The ring can include a suction port defined entirely by the ring and in fluid communication with the suction cavity. The suction port can be configured to receive hydraulic fluid from a first region between the ring and the rotor. The ring can include a pressure port defined entirely by the ring and in fluid communication with the pressure cavity. The pressure port can be configured to allow for passage of the hydraulic fluid from the pressure cavity to a second region between the ring and the rotor.

In Example 2, the hydraulic device of Example 1, further optionally comprising a first end plate and a second end plate, wherein the first end plate can be coupled to a first axial side of the ring and the second end plate can be coupled to a second opposing side of the ring, wherein the suction cavity and the pressure cavity can be defined entirely by the ring and can be spaced from the first end plate and the second end plate of the hydraulic device.

In Example 3, the hydraulic device of Example 2, further optionally comprising a valve assembly mounted to the ring and positioned adjacent and between the first end plate and the second end plate, wherein the valve assembly can be in fluid communication with the pressure cavity and can be configured to regulate the hydraulic fluid to the pressure cavity.

In Example 4, the hydraulic device of any one or combination of Examples 1-3, further optionally comprising: a first thrust bearing disposed adjacent a first axial end of the rotor; and a second thrust bearing disposed adjacent a second axial end of the rotor, the second axial end opposing the first axial end.

In Example 5, the hydraulic device of any one or combination of Examples 1-4, wherein the suction cavity and the pressure cavity are defined entirely by the ring.

In Example 6, the hydraulic device of any one of Examples 1-5, wherein the suction port can comprise two suction ports including a first suction port and a second suction port, wherein the first suction port can be positioned on substantially an opposing side of an inner diameter surface of the ring from the second suction port, and wherein the pressure port can comprise two pressure ports spaced from the two suction ports, the two pressure ports including a first pressure port and a second pressure port, wherein the first pressure port can be positioned on substantially an opposing side of the inner diameter surface of the ring from the second pressure port.

In Example 7, the hydraulic device of Example 6, wherein the pressure cavity can have a single inlet thereto defined by the ring and can be divided into two sections including a first pressure section that connects with the first pressure port and a second pressure section that connects with the second pressure port, and wherein the suction cavity can have a single outlet thereto defined by the ring and can be divided into two sections including a first suction section that connects with the first suction port and a second suction section that connects with the second suction port.

In Example 8, the hydraulic device of Example 7, wherein one of the first pressure section or the first suction section splits to pass around the other of the first pressure section or the first suction section.

In Example 9, the hydraulic device of any one or combination of Examples 1-8, further optionally comprising a plurality of rollers, wherein each of the plurality of rollers can be coupled to a respective one of the plurality of vanes at an outer end portion thereof.

In Example 10, the hydraulic device of any one or combination of Examples 1-9, wherein the plurality of vanes can be configured having one of an intra vane clamp assembly, a push pin assembly or a step vane.

In Example 11, the hydraulic device of any one or combination of Examples 1-10, wherein, when viewed in the cross-section, the ring can be one of substantially square or rectangular shape as defined by an outer surface thereof.

In Example 12, the hydraulic device of Example 11, wherein the ring can have a plurality of ports in the outer surface positioned on at least two sides of the outer surface.

In Example 13, the hydraulic device of any one or combination of Examples 1-12, wherein an entire axial length of the ring is between 75 mm and 125 mm.

In Example 14, a system optionally comprising:

- a hydraulic device, the hydraulic device comprising:
  - a rotor disposed for rotation about an axis;
  - a plurality of vanes, each of the plurality of vanes moveable relative to the rotor between a retracted position and an extended position where the plurality of vanes work a hydraulic fluid introduced adjacent the rotor; and
  - a ring disposed at least partially around the rotor, the ring comprising:
    - suction cavity and pressure cavity, wherein the suction cavity and pressure cavity are configured for ingress and egress of a hydraulic fluid through the ring;
    - a suction port defined entirely by the ring and in fluid communication with the suction cavity, wherein the suction port is configured to receive hydraulic fluid from a first region between the ring and the rotor; and
    - a pressure port defined entirely by the ring and in fluid communication with the pressure cavity, wherein the pressure port is configured to allow for passage of the hydraulic fluid from the pressure cavity to a second region between the ring and the rotor;
  - a torque generating device coupled to one of the rings or the rotor; and
  - an energy storage device in fluid communication with the hydraulic device, wherein the hydraulic fluid is selectively operable as a starter motor for the torque generating device using the hydraulic fluid supplied from the energy storage device.

In Example 15, the system of Example 14, wherein energy storage device comprises an accumulator.

In Example 16, the system of any one or any combination of Examples 14-15, further optionally comprising a first end plate and a second end plate, wherein the first end plate can be coupled to a first axial side of the ring and the second end plate can be coupled to a second opposing side of the ring, wherein the suction cavity and the pressure cavity can be defined entirely by the ring and can be spaced from the first end plate and the second end plate of the hydraulic device.

In Example 17, the system of any one or any combination of Examples 14-16, further optionally comprising a valve assembly in fluid communication with the pressure cavity and configured to regulate the hydraulic fluid to the pressure cavity.

In Example 18, the system of any one or any combination of Examples 14-17, further optionally comprising a controller operable to control a system operation mode based on a plurality of vehicle operation parameters.

In Example 19, the system of Example 18, wherein the system operation mode optionally includes operating the hydraulic device as one of a hydraulic coupling or vane pump in addition to the starter motor, and wherein the system operation mode comprises controlling the hydraulic device and one or more accessories that can include the energy storage device in one or more of an accessory operation mode, a vehicle idle/drive mode, a regenerative energy storage mode, a regenerative energy application mode, a vane pumping mode and a startup mode.

In Example 20, the system of any one or any combination of Examples 14-19, wherein a fluid communicating interior portion of the hydraulic device and the one or more accessories can be coated in a diamond or diamond-like carbon, and wherein the hydraulic fluid comprises glycol or water-glycol.

In Example 21, the apparatuses and systems of any one or any combination of Examples 1-21 can optionally be configured such that all elements or options recited are available to use or select from.

These and other examples and features of the present devices, systems, and methods will be set forth in part in the following Detailed Description. This overview is intended to provide a summary of subject matter of the present patent application. It is not intended to provide an exclusive or exhaustive removal of the invention. The detailed description is included to provide further information about the present patent application.

BRIEF DESCRIPTION OF THE DRAWINGS

Further In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DESCRIPTION OF EMBODIMENTS

Figure 1:
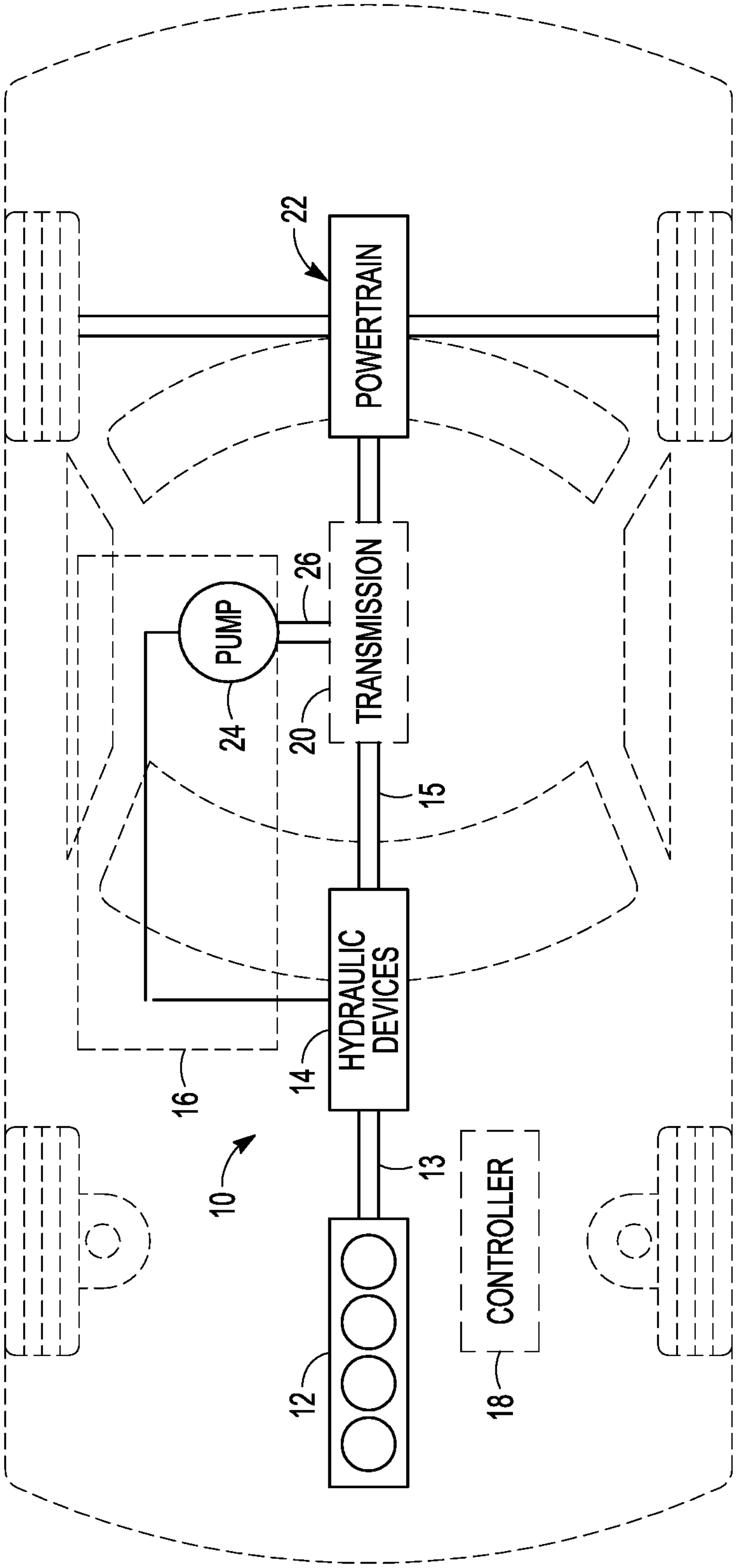
FIG. 1 is a schematic view of a vehicle including a vehicle system having a hydraulic device and one or more accessories according to an example of the present application.

The present application relates to hydraulic devices and systems that can utilize the of hydraulic device(s). Examples disclosed herein include the present hydraulic device can be used as one or more of a starter motor, a hydraulic coupling, a motor, or a vane pump. During starter motor mode of operation, a pilot signal can be sent to the step under the vane to push the vane out against the ring contour as desired. The hydraulic device can be used as part of a system that can include an accumulator to operate the present hydraulic devices as the starter motor to start the engine at higher speed then normal. This high speed start can prevent or reduce instances of over fueling that occurs from the normal low speed starter motor systems.

U.S. patent application Ser. No. 13/510,643, describes a hydraulically controllable coupling configured to couple a rotating input to an output to rotate. The present hydraulic devices can have such functionality. Furthermore, the present hydraulic device can also be switched to act as a vane pump and operation between a pumping mode and a mode in which it does not pump. U.S. Provisional Patent Application Ser. No. 62/104,975 also describes systems and methods using a plurality of hydraulic devices each configured to be operable as a hydraulic coupling and as a vane pump. The entire specification of each of the U.S. patent application Ser. No. 13/510,643 and the U.S. Provisional Patent Application Ser. No. 62/104,975 are incorporated herein by reference in entirety.

The hydraulic devices described herein can be utilized with various systems, such as those described in U.S. patent application Ser. No. 15/544,829. The hydraulic devices described herein can be used with various accessories including a hydraulic pump motor, an accumulator, and various vehicle auxiliary systems and can be utilized as part of systems that have various operation modes including accessory operation mode, a vehicle idle/drive mode, a regenerative energy storage mode, a regenerative energy application mode, a vane pumping mode, a startup mode, tandem torque amplifying wheel drive mode, a tandem steady state wheel drive mode, a tandem vane pumping mode, a regenerative energy storage mode, and a regenerative energy application mode as described in U.S. patent application Ser. No. 15/544,829. If using a plurality of hydraulic devices this plurality can provide operational flexibility, being selectively non-operable, selectively operable as only a vane pump (e.g. in a maximum pump mode), operable as only a hydraulic coupling (e.g., in a maximum drive mode), operable as both a vane pump and a hydraulic coupling (e.g., in a variable pump and drive mode), and operable as a vane pump with a variable displacement (e.g., in a variable displacement mode).

Other examples not specifically discussed herein with reference to the FIGURES can be utilized. The disclosed vehicle systems are applicable to various types of vehicles such as, but not limited to, earth moving equipment (e.g., wheel loaders, mini-loaders, backhoes, dump trucks, crane trucks, transit mixers, etc.), waste recovery vehicles, marine vehicles, industrial equipment (e.g., agricultural equipment), personal transportation vehicles, public transportation vehicles, and commercial road vehicles (e.g., heavy road trucks, semi-trucks, etc.), and indeed any type of vehicle.

FIG. 1 shows a highly schematic view of a system 10 aboard a vehicle. As will be discussed subsequently, the system 10 can include a torque source 12, an input shaft 13, at least one hydraulic device 14, an output shaft 15, a plurality of accessories 16, a controller 18, a transmission 20, and a power train 22. The plurality of accessories 16 can include a pump motor 24 and one or more output shafts 26.

Figure 2:
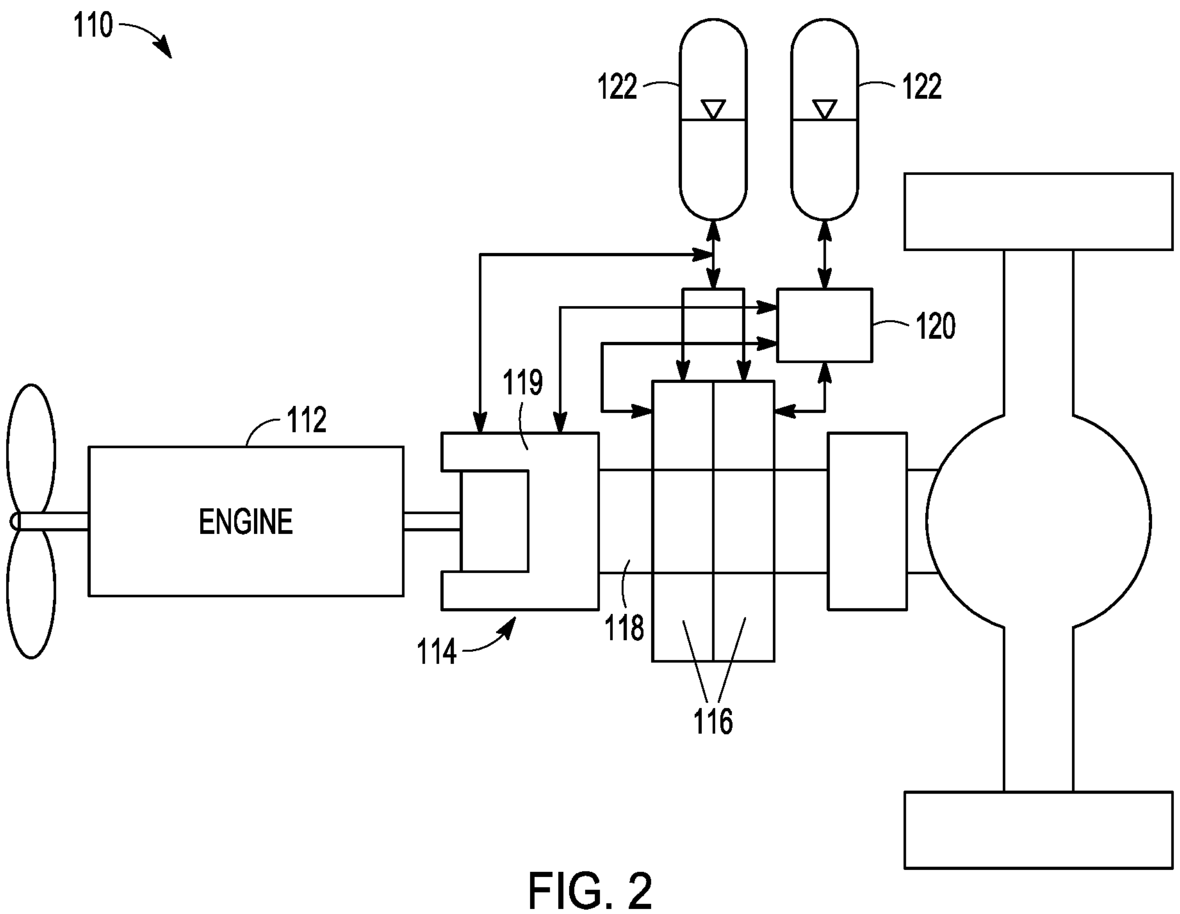
FIG. 2 is a schematic view of a second vehicle including a second vehicle system having the hydraulic device and one or more accessories according to an example of the present application.

The illustration of FIG. 1 represents one possible configuration (e.g., with the hydraulic device 14 disposed before the transmission 20 and with output shafts 15 (including shaft 26) coupled to the transmission 20). Other configurations are possible. The torque source 12 can comprise any source including, but not limited to, an engine, a flywheel, an electric motor, etc. The torque source 12 can be coupled the input shaft 13 of the hydraulic device 14. The torque source 12 can be configured to outputs torque/power to the hydraulic device 14 according to many operation modes. However, in some cases the hydraulic device 14 can act as a starter motor as shown in FIG. 2 to input torque/power to the torque source 12 (e.g., if the torque source is an engine it can be turned at some speed, so that it sucks fuel and air into the cylinders, and compresses it) in the startup mode. The hydraulic device 14 can selectively transmit the torque/power of the torque source 12 via the output shaft 15 to the transmission 20 or another power train 22 system. Although not illustrated in FIG. 1, the hydraulic devices 14 can be intelligently controlled by pilot signal(s), valve(s), etc. to selectively transmit power/torque or utilize the power/torque for pumping a hydraulic fluid to or from the plurality of vehicle accessories 16. The controller 18 (e.g. vehicle ECU) can be configured to communicate with various systems and components of the system 10 and vehicle and can be operable to control the system operation mode based on a plurality of vehicle operation parameters (e.g. start, deceleration, acceleration, vehicle speed, desire or need to operate various auxiliary systems including hydraulically powered systems, etc.).

FIG. 1 illustrates an example where the hydraulic device 14 is in fluid communication with the plurality of accessories 16. FIG. 1 illustrates one of the accessories 16, the pump motor 24, which is coupled to the transmission 20 by the output shaft 26. According to additional examples, the plurality of accessories 16 can comprise, for example, an accumulator, and/or one or more auxiliary systems (e.g., systems for cooling fan drives, dump boxes, power steering, compressor systems, alternator systems, braking systems, fire suppression systems, hydraulic equipment related systems, etc.).

In one example, the pump motor 24 can comprise a digitally controlled piston pump. The pump motor 24 can be controlled by various methods including, but not limited to, electronically, pressure compensated, lever, or digitally. The pump motor 24 is coupled to the transmission 20 by the output shaft 26 (e.g., part of shaft 15) and can receive torque from or apply torque to the transmission 20. According to one example, the hydraulic pump motor 24 can include a port in fluid communication with the discharge pressure of the hydraulic device 14. According to one mode of system operation, the pump motor 24 can receive hydraulic fluid at the discharge pressure from one or more of the hydraulic devices 14 to propel the transmission 20. The pump motor 24 can be stroked on slightly or fully in this condition; the degree of stroke is inconsequential as there can be little inlet port pressure.

In general, the hydraulic devices 14 can have a rotor body and at least a first vane configured for movement relative to the rotor body. The hydraulic device can be adapted to retain the first vane in a retracted vane mode of operation and to release (and/or extend) the first vane in a vane extended mode of operation in which the first vane extends to hydraulically work fluid when the first vane is moved with respect to the rotor body. The input shaft 13 and the output shaft 15 can coupled to rotate together in the vane extended mode of operation (i.e. the hydraulic devices operate as hydraulic couplings) if the output shaft 15 is not fixed or has sufficient resistance to couple. In other operation modes, the input shaft 13 and output shaft 15 can be free to rotate with respect to one another in a vane extended mode of operation (i.e. the hydraulic devices operate as vane pumps) if the output shaft 15 is either fixed or has does not create sufficient resistance to entirely couple.

According to the example of in FIG. 1, one or more of the hydraulic devices 14 can operate as a hydraulic pump, and thus, operates as part of a hydraulic system for the vehicle. Various intelligent controls (electronic, pressure compensated, lever, and/or digital) of valves, bleed valves, components, etc. can be utilized to control the direction and amount of hydraulic fluid to and from the plurality of accessories 16 and the plurality of hydraulic devices 14. The present systems benefit from precise control. For example, programmable torque settings affected by adjustment of the pressure relief setting result in predetermined stall points. Such programmable stall points can be either fixed or remotely set by associating relief valve setting with a remote conventional override relief valve. A further benefit of precise control can be controlled acceleration or deceleration by varying relief valve settings to match desired maximum torques. In such embodiments, start and stop torques can be reduced to limit high peak torque levels that can damage machinery.

According to further examples, the controller 18 can operate as a remote pressure control. In some examples, the remote pressure control is coupled to one side of a balance piston, with pump output in fluid communication with the opposite side of the balance piston. The balance piston is to control whether the hydraulic device can pump hydraulic fluid. For example, if the remote pressure control is set to a pressure, the balance piston allows coupling discharge pressure to rise until the device discharge pressure is higher than the pressure, moving the balance piston to overcome the remote pressure control pressure. As the balance piston moves, it enables the device discharge to drain, such as to tank. In such a manner, the maximum torque transmitted is remotely controllable via the remote pressure control signal. In some examples, the remote pressure control is used in addition to a primary relief valve that allows hydraulic fluid to pump in any case where a torque differential between the input shaft 13 and the output shaft 15 exceeds a predetermined threshold.

FIG. 2 illustrates the system 110 schematically with a hydraulic device 114 coupled to a torque source 112 for starter motor function. The hydraulic device 114 can comprise any of the hydraulic vane devices previously or subsequently described. Thus, according to some cases the hydraulic device 114 can include retainers (examples shown in further embodiments) configured to retain and capture the vanes that form working surfaces that would, in a vane extended mode, work hydraulic fluid through the couple. In various examples, a pilot signal is used to control the retainers and/or other components of the system 110 as further discussed herein. The system 110 can optionally include two or more devices 116 such as two hydraulic pump motors 24 as previously described. The two or more devices 116 can also comprise any type of starter motor know in the art. According to further examples, the two or more devices 116 can be two or more hydraulic vane devices each configured for operation as a starter motor as further illustrated and described herein.

The two or more devices 116 can be coupled to an output shaft 118 in series and the output shaft 118 can be coupled for rotation with a ring 119 of the hydraulic device 114. As discussed previously and subsequently, the hydraulic device 114 can be one or more hydraulic vane devices such as those known in the art and incorporated by reference or disclosed herein. The hydraulic device 114 can be configured for operation as a power split coupling, a hydraulic motor, and/or a starter motor, for example.

According to the example of FIG. 2, the system 110 includes a valve 120 to control fluid communication within parts of the system 10. Optionally, one, two or more accumulators 122 comprising one of the accessories contemplated previously discussed in FIG. 1 can store pressurized fluid and can be used in various operation modes including in starter motor operation mode, energy capture mode (e.g., capturing energy during engine braking, conventional braking, or down hill), regenerative energy application mode (e.g., torque boost mode for driving into heap when in loading using power split coupling as a pump, etc.) and other modes discussed herein. Regenerative energy application mode can utilize the valve 120 to meter energy from one or more of the accumulators 120.

Figure 2A:
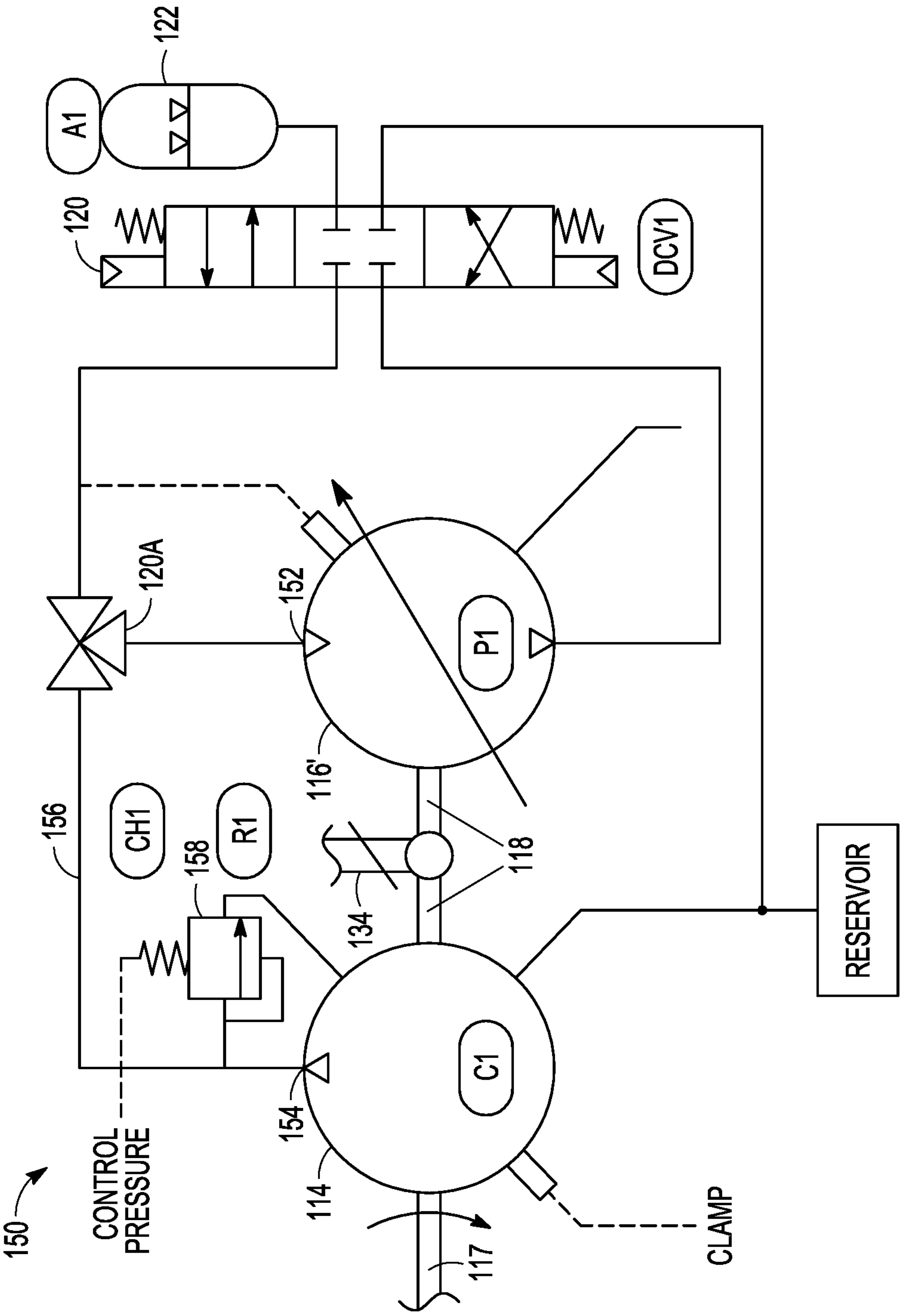
FIG. 2A is a schematic view of a control system of the system of FIG. 2, according to an example of the present application.

FIG. 2A shows an exemplary schematic diagram of a control system 150 that can be utilized with the systems 10 and 110 disclosed herein. Further control systems and arrangements are also contemplated. As was the case in the systems of FIGS. 1 and 2, the system 150 illustrates the pump motor 24 (FIG. 1) or two or more devices 116 (FIG. 2) (e.g., two or more hydraulic pump motors). For simplicity, only a single device numbered 116' is illustrated in FIG. 2A but it should be recognized that the device 116' can be two or more devices such as those of FIG. 2. The device 116' can be controlled by various methods including, but not limited to, electronically, pressure compensated, lever, or digitally. The device 116' can include the output shaft 118 coupled to the gearbox 134, the device 116 can include an inlet 152 in fluid communication with the discharge pressure 154 of the hydraulic device 114 or from the one or more accumulators 122. The device 116' can be configured to receive fluid 156 from the discharge pressure 154 of the hydraulic device 114 or from the one or more accumulators 122 to propel the output shaft or to perform other operations.

According to various of the modes discussed previously, the hydraulic device 114 can be configured to operate as a couple to allow an input 117 to spin with respect to the output shaft 118. This is equivalent to a neutral condition for the vehicle. A relief valve 158 allows the hydraulic device 114 to slip should a problem occur, in a manner that a clutch might slip. In additional embodiments, the relief valve 158 can be used to control the torque output magnitude of the hydraulic device 114. As a torque amplifier in a regenerative braking mode of operation, the hydraulic device 114 can be engaged or disengaged. The device 116' can be stroked or operates in a pumping mode to direct fluid generated during vehicle deceleration into the accumulators 122. If the accumulator is full, the hydraulic device 114 or device 116' can be used to force fluid over a relief valve, or it can optionally be stroked off of pumping. In various examples, wheel brakes are used to assist in stop. In some additional examples, the hydraulic device 114 can be engaged to allow for engine braking. According to further modes of operation, energy stored in one or more of the accumulators 122, such as energy stored during deceleration of the vehicle, can used to accelerate the vehicle or perform other mode of operation such as start the engine. According to one example, the valve 120 and a valve 120A can be adjusted and the device 116' (configured as a pump motor) can propel the vehicle. In this mode, the hydraulic device 114 can be engaged and can pump fluid until the resistance from the fluid 156 reaches a magnitude to substantially lock the hydraulic device 114 as a hydraulic couple. The fluid 156 can reach such a pressure through adjustment of the valve 120 and the valve 120A. The fluid 156 can additionally reach such a pressure when the device 116' experiences a high resistance to propulsion (such as associated with drive into the heap, etc.). According to a further example, the valve 120 and the valve 120A can be adjusted and the device 116' (configured as a starter motor) can operate to turn the input 117 while being configured so as not to operate the output shaft 118. In this mode, the hydraulic device 114 can be engaged as a hydraulic couple to turn the engine. According to yet further examples, the valve 120 and the valve 120A can be adjusted and the hydraulic device 114 (configured as a starter motor) can operate to turn the input 117 without the need of operation of the device 116'. Tandem operation of the hydraulic device 114 and the device 116' for starter motor and other operation modes is also contemplated.

In one example, a fluid communicating interior portion of at least one of the plurality of hydraulic devices and/or the plurality of accessories can be coated in a diamond or diamond-like carbon. According to further examples, the fluid communicating interior portion includes a roller bearing of each of the plurality of hydraulic devices and/or and an inner face of a gear ring of the transmission. The diamond or diamond-like carbon coating can comprise a coating as disclosed in U.S. Pat. No. 8,691,063B2, the entire specification of which is incorporated herein by reference. The use of a diamond or diamond-like coating can reduce or prevent corrosion of the steel housing and other steel components that are in fluid communication with the hydraulic fluid. Thus, the diamond or diamond-like carbon coating can allow for the use of environmentally friendly hydraulic fluids such as glycol that may otherwise have been too corrosive.

Figure 3:
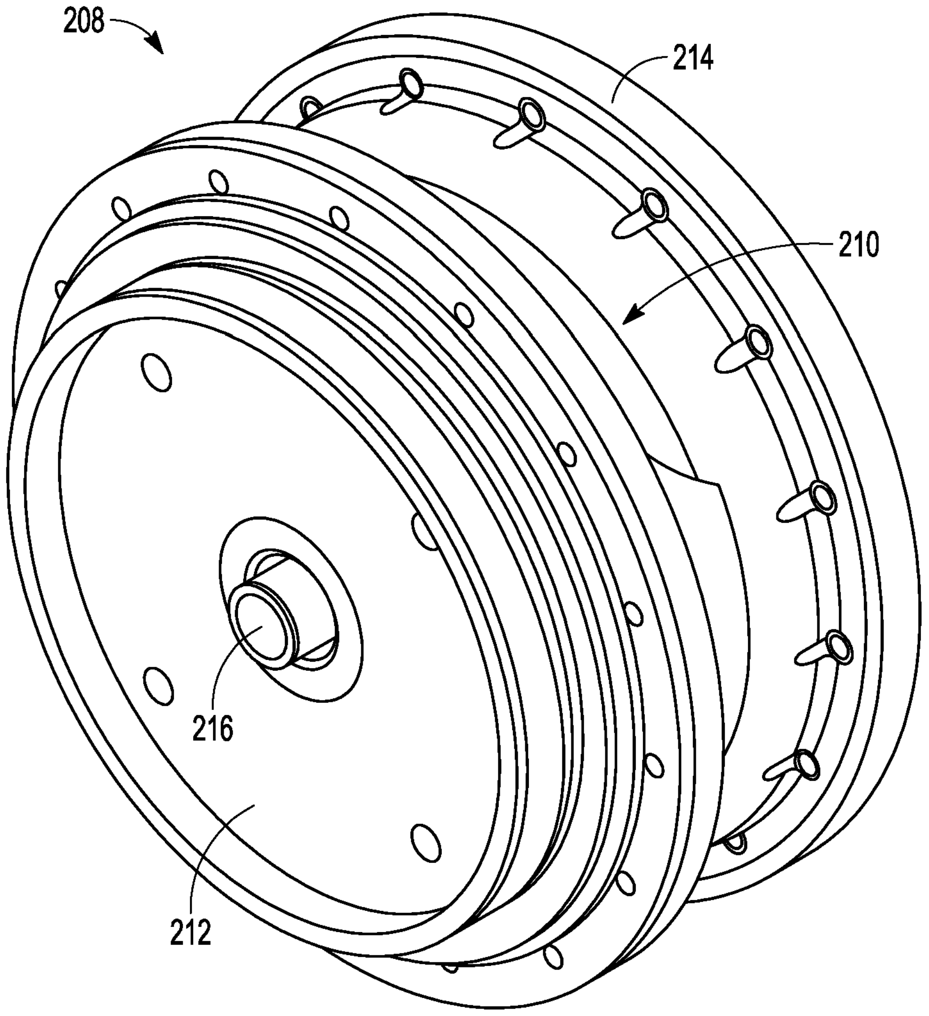
FIG. 3 is a perspective view of the hydraulic device according to one example of the present application.

FIG. 3 illustrates an exemplary hydraulic vane device 210 configured for starter motor operation, hydraulic pumping, etc. In the remaining FIGURES, the hydraulic device 210 comprises a variable vane hydraulic device. Further information on the construction and operation of hydraulic vane devices can be found, for example, in United States Patent Application Publication 2013/0067899A1 and U.S. Pat. Nos. 7,955,062, 8,597,002, and 8,708,679 owned by the Applicant and incorporated herein by reference.

FIG. 3 shows a perspective view of an assembly 208 including the hydraulic vane device 210 and additionally an engine plate 212 and a gear plate 214. The hydraulic vane device 210 can be mounted between the engine plate 212 and gear plate 214. FIG. 3 additionally illustrates an input shaft 216 that can be part of the assembly 208. The input shaft 216 can be coupled to the hydraulic vane device 210. The input shaft 216 passes through the engine plate 212.

Figure 3A:
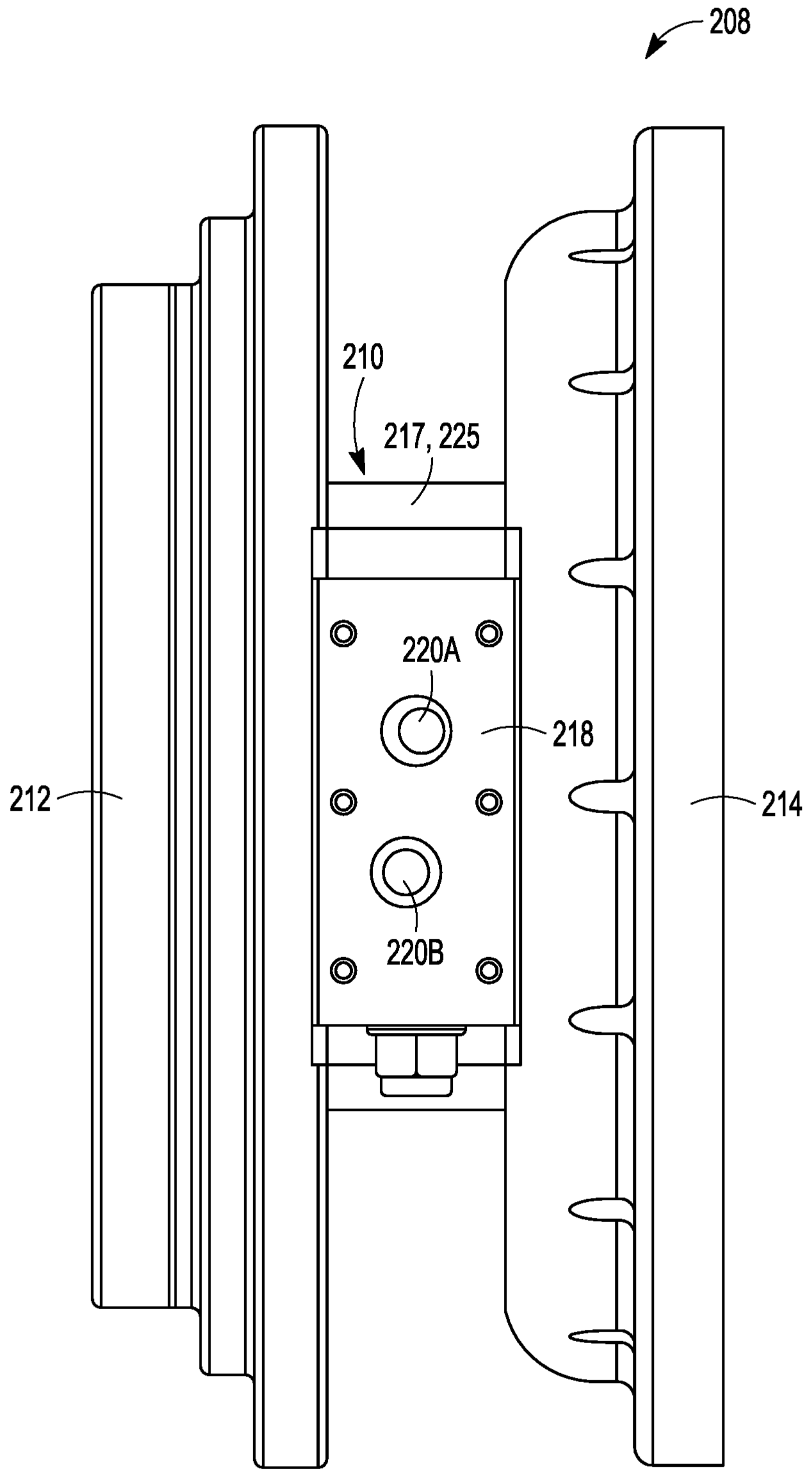
FIGS. 3A and 3B are side views of different sides of the hydraulic device of FIG. 3.
Figure 3B:
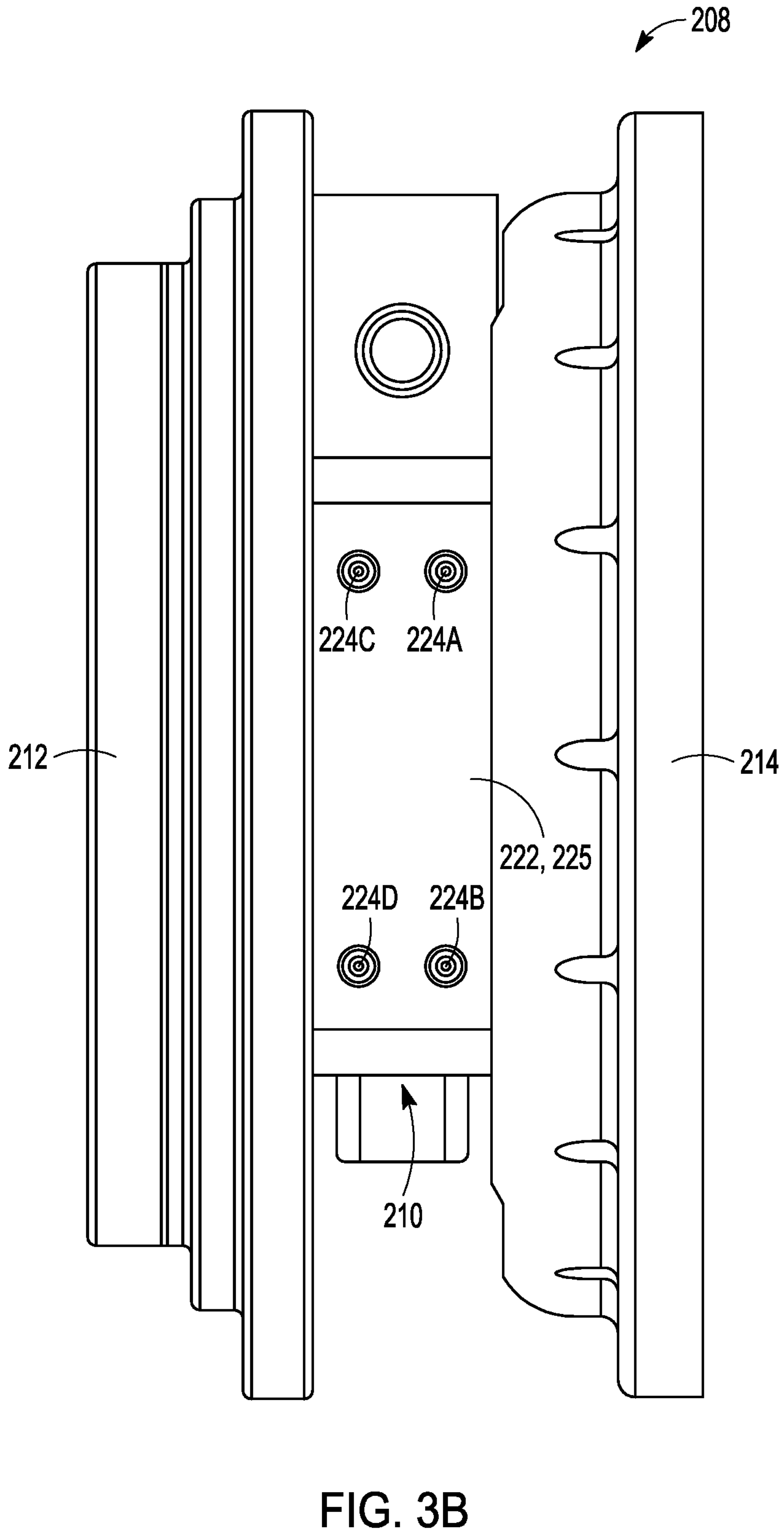

FIGS. 3A and 3B show plan views of different sides of the assembly 208 and the hydraulic vane device 210. As shown in FIG. 3A, a first outer surface side 217 of the hydraulic vane device 210 can include a valve assembly 218. The valve assembly 218 can be mounted to the hydraulic vane device 210 and can be positioned between the engine plate 212 and the gear plate 214. The valve assembly 218 can include ports 220A and 220B. FIG. 3B shows a second outer surface side 222 of the hydraulic vane device 210 including ports 224A, 2246, 224C and 224D. The ports 224A, 2246, 224C and 224D as for drainage and/or for vane capture, for example. When viewed in the cross-section as in FIG. 4 (or indeed in FIGS. 3-3B), the ring 226 can be one of substantially square or rectangular shape as defined by an outer surface thereof. The outer surface 225 can be defined in part by the outer surface side 218 and the second outer surface side 222.

Figure 4:
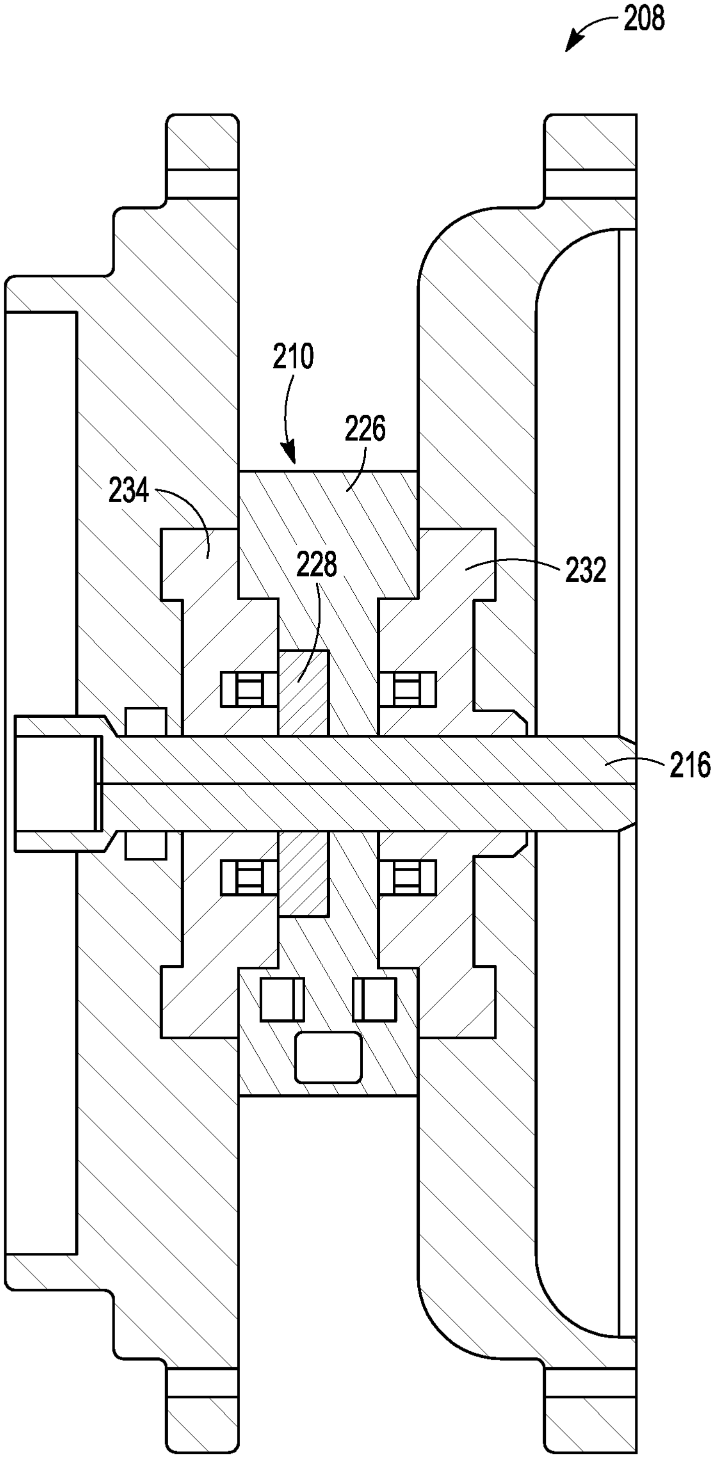
FIG. 4 is a first cross-sectional view of the hydraulic device of FIG. 3.
Figure 4A:
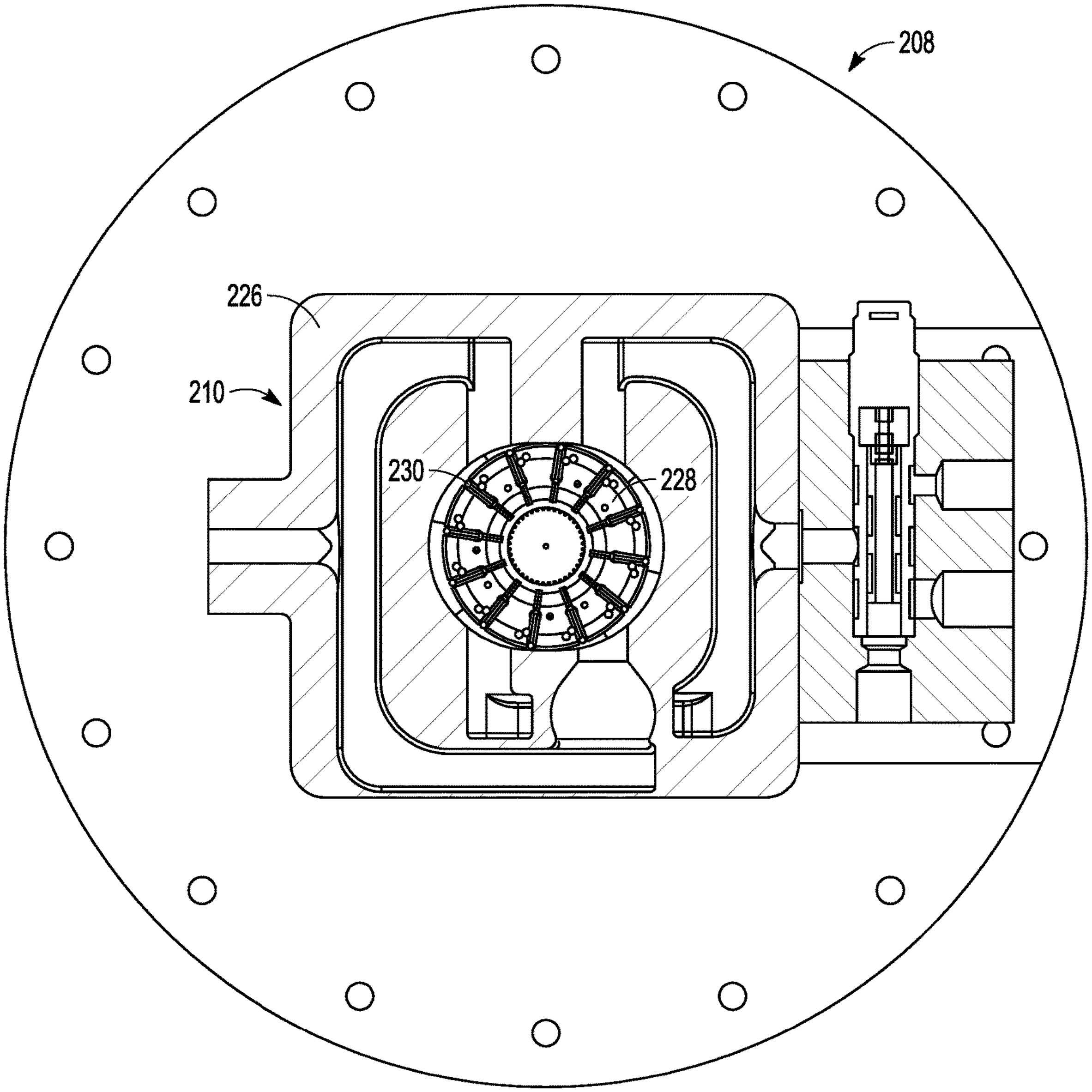
FIG. 4A is a second cross-sectional view of the hydraulic device of FIG. 3.

FIGS. 4 and 4A show cross-sectional views of the assembly 208 including the hydraulic vane device 210. The hydraulic vane device 210 can include a ring 226, a rotor 228 and a plurality of vanes 230 (FIG. 4A).

As used herein, the terms "radial" and "axial" are made in reference to axis that extends along the input shaft 216. As will be illustrated in subsequent FIGURES, the rotor 228 can have a plurality of circumferentially spaced slots. The slots can be configured to house the plurality of vanes 230.

As shown in FIG. 4, the assembly 208 can include a first side plate 232 (sometimes referred to as a first end plate) and a second side plate 234 (again sometimes referred to as a second end plate). As shown in FIG. 4, the first side plate 232 can be coupled to a first axial side of the ring 226 and the second side plate 234 can be coupled to a second opposing side of the ring 226. The input shaft 216 can extend into and can extend through the hydraulic vane device 210 and can extend to adjacent an output shaft (not shown). The rotor 228 can be selectively coupled for rotation with (or to drive rotation of) the input shaft 216. Input shaft 216 can be configured to couple with further shafts such as via spline or other mechanical connection. The ring 226 can be disposed at least partially around the rotor 228 (e.g., can interface therewith).

Turning to FIG. 4A, the rotor 228 can be disposed for rotation about an axis defined by the input shaft 216. The plurality of vanes 230 can be positioned in the rotor 228. Each of the plurality of vanes 230 can be moveable relative to the rotor 228 between a retracted position and an extended position (refer to FIGS. 4B and 4C) where the plurality of vanes work a hydraulic fluid introduced adjacent the rotor 228. As previously, discussed the ring 226 can be disposed at least partially around the rotor 228.

Figure 6A:
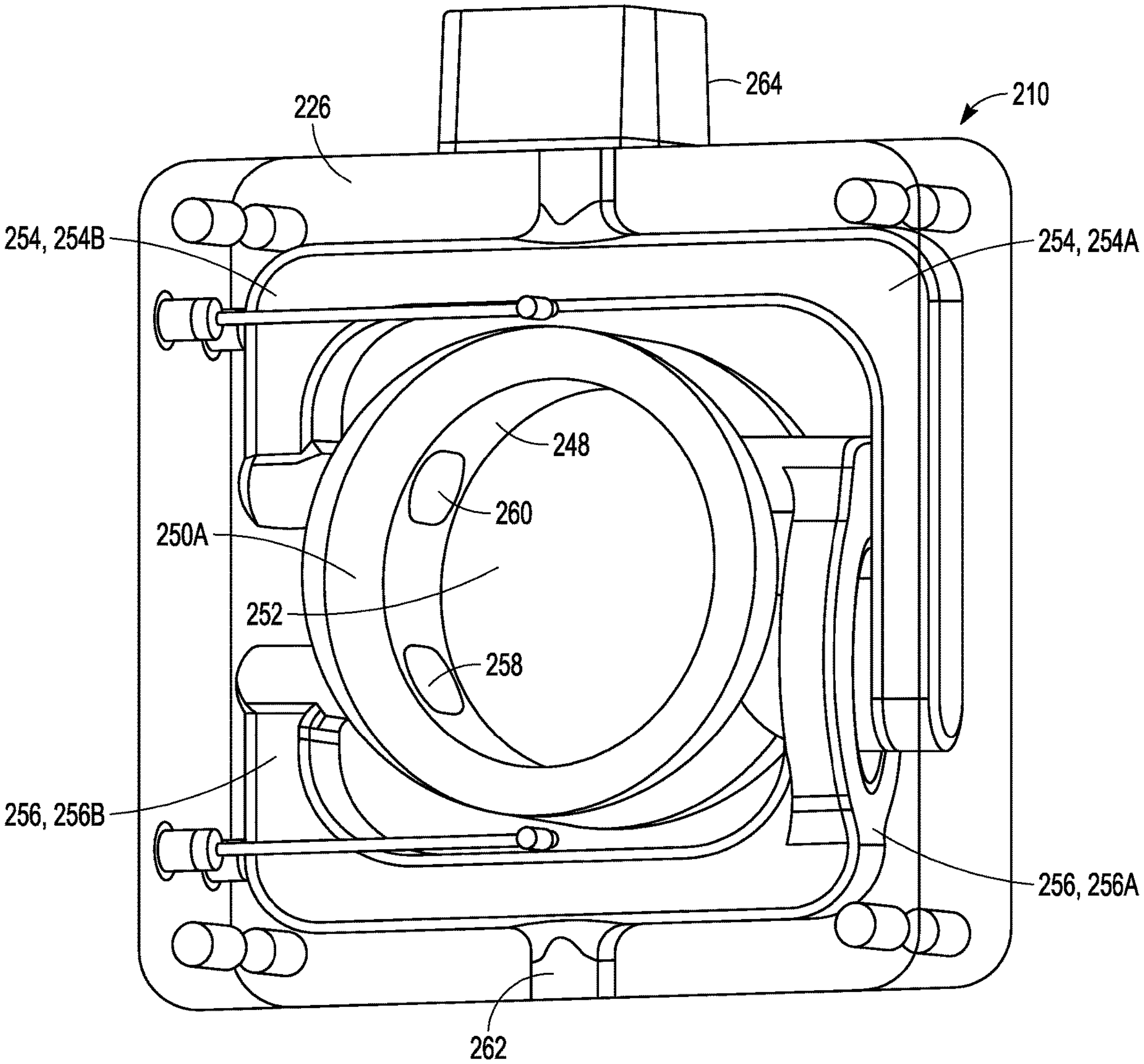
FIG. 6A is a schematic perspective view or a ring of the hydraulic device of FIG. 3 with portions of the ring broken away to show additional features of the ring according to an example of the present application.
Figure 6B:
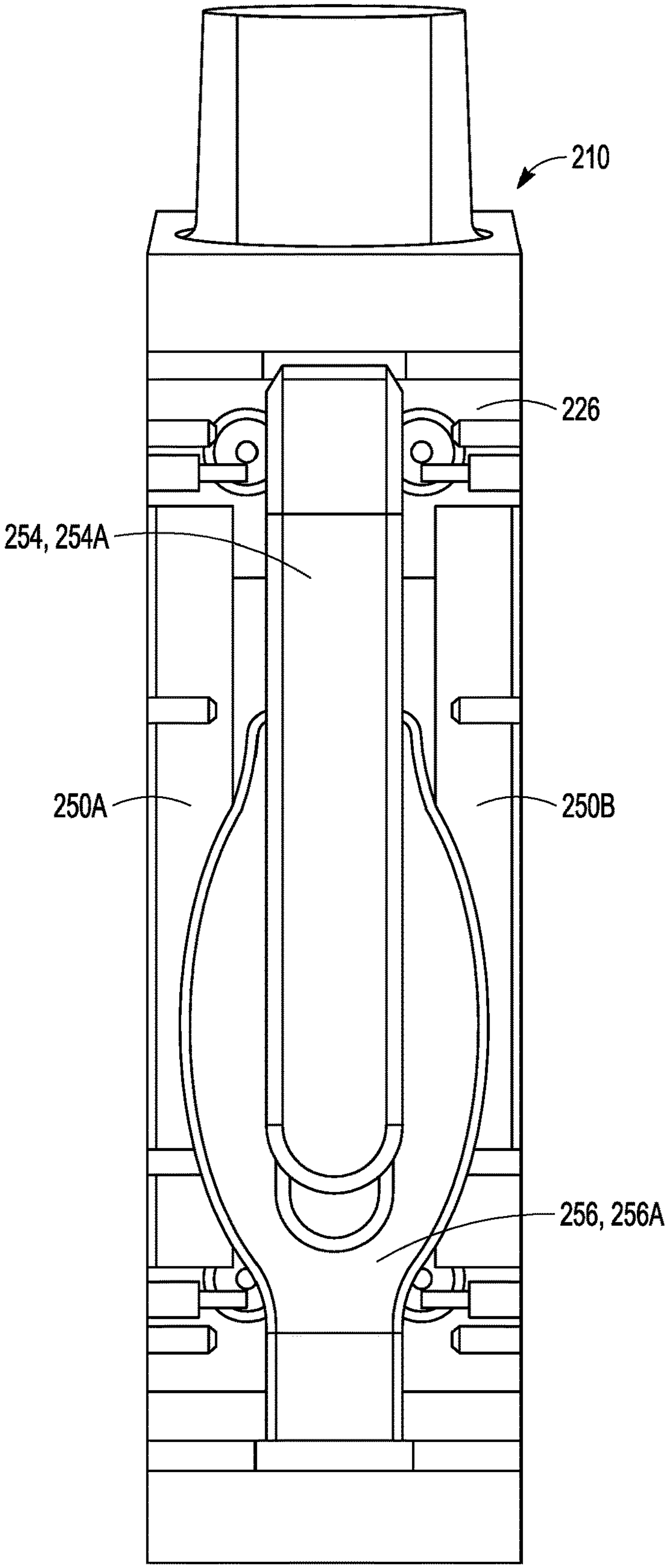
FIG. 6B is a schematic side view of the ring of FIG. 6A.

In operation, the ring 226 can define a working cavity (also referred to as a chamber and further discussed and illustrated in FIGS. 6A and 6B) in fluid communication with an inlet and a discharge pressure (sometimes called a suction and pressure) of the hydraulic device 210. According to the illustrated example of FIG. 4A, a rotating group that includes the rotor 228 and the input shaft 216 can be configured to rotate around the axis inside the working cavity.

Figure 4B:
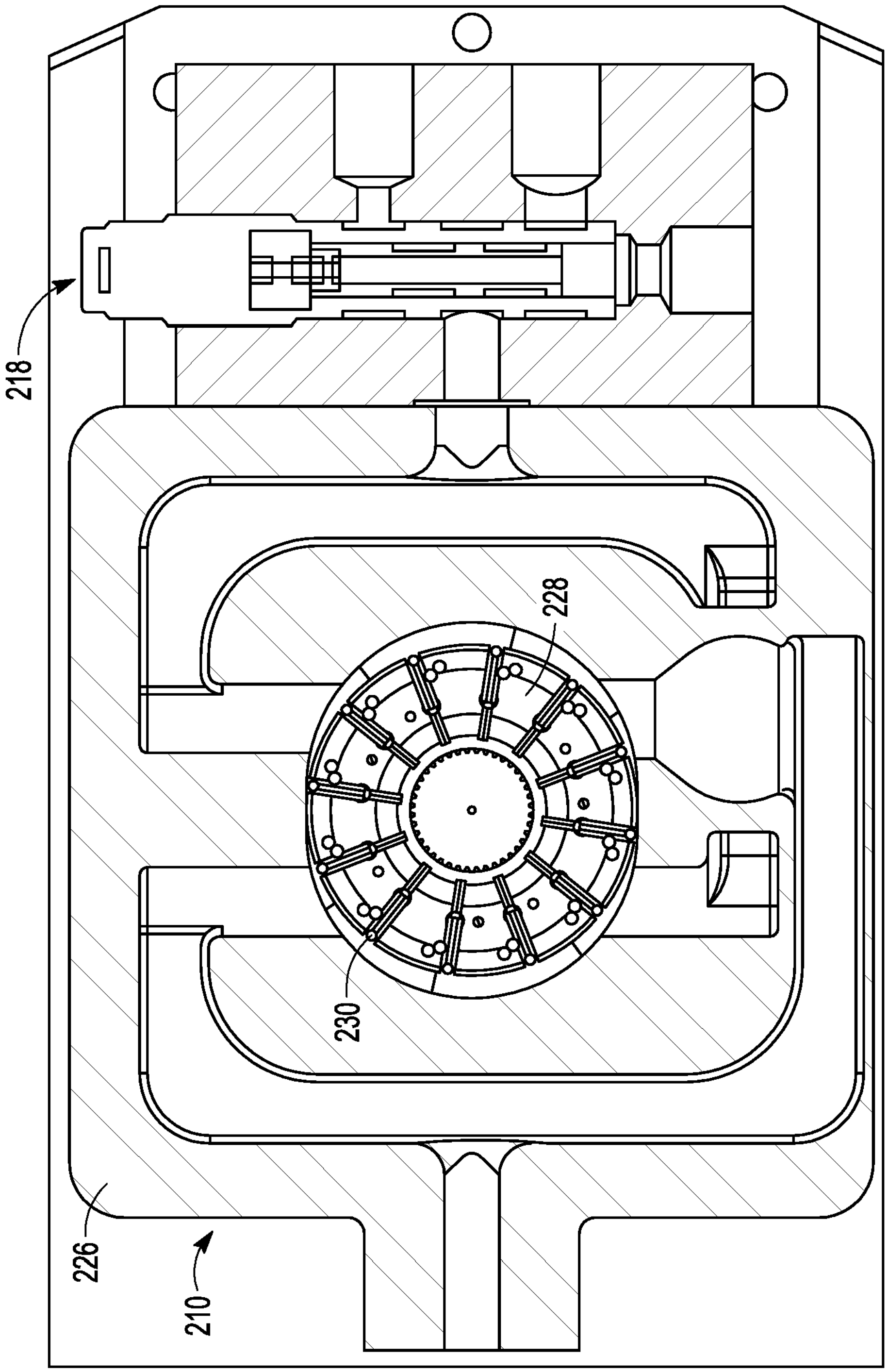
FIGS. 4B and 4C are enlarged views of the second cross-sectional view of FIG. 4A.
Figure 4C:
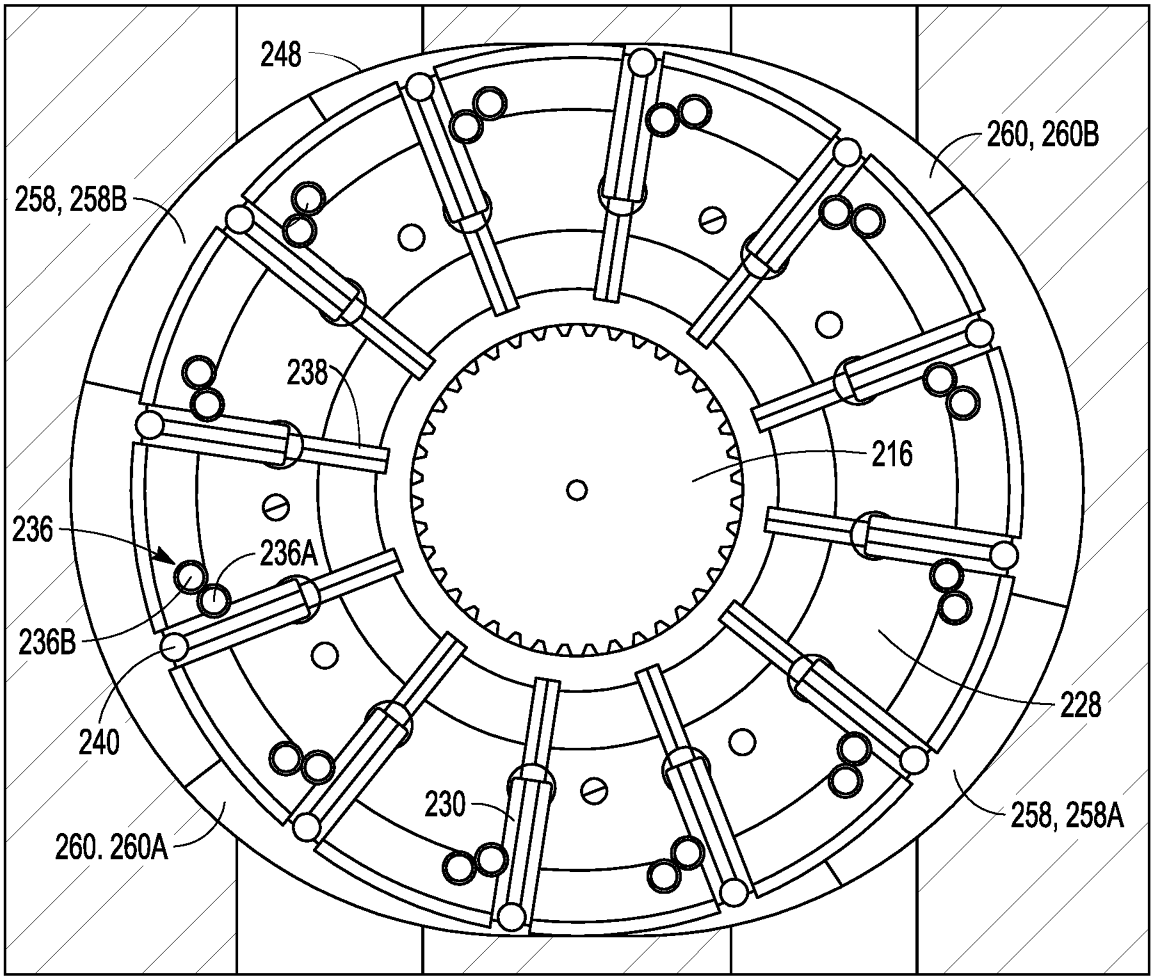
Figure 5:
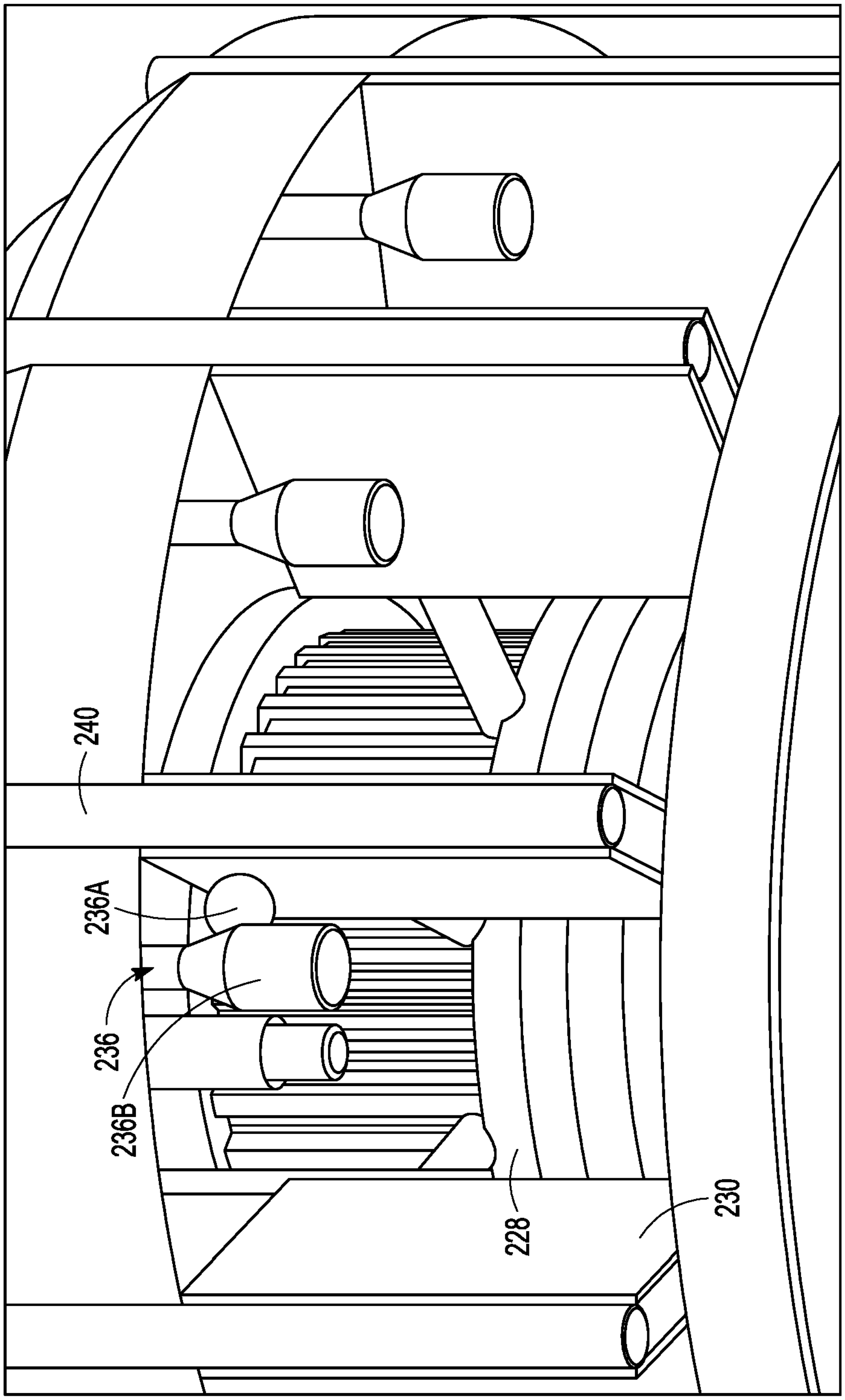
FIG. 5 is a schematic perspective view of portions of a rotor and a plurality of vanes of the hydraulic device of FIG. 3, the portions of the rotor broken away to show further components of the hydraulic vane device according to an example of the present application.

FIG. 4B shows an enlarged view of the rotor 228, portions of the ring 226 and the plurality of vanes 230. As shown in FIG. 4B, the valve assembly 218 can be in fluid communication with the pressure cavity (refer to FIGS. 6A and 6B) and can be configured to regulate the hydraulic fluid to the pressure cavity. FIG. 5 shows a schematic perspective view of a portion of the rotor 228 and several of the plurality of vanes 230 illustrating internal components of the rotor 228. As shown in FIGS. 4A and 4B, the plurality of vanes 230 can be configured as variable position vanes. As shown in FIGS. 4C-5, the vanes 230 are shown in the retracted position and are retained in this position by retainers 236 (e.g., balls 236A that are configured to be received in detents in the vanes 230 and retention devices 236B). The retainers 236 can apply a clamping force to lock the vanes 230 in the retracted position.

Hydraulic pressure or other actuating force can be configured move the retainers 236 (in particular the retention devices 236B, and correspondingly, the balls 236A out of engagement with the vanes 230. The vanes 230 can then be positioned as desired (including to the vane extended position engaging the ring 226 with an outer radial tip) using actuators 238 such as push pins that are coupled to an inner radial end portion of each of the vanes 230. Centrifugal force, hydraulic pressure or other mechanisms for extending the vanes 230 are also contemplated.

In various examples, the hydraulic fluid can comprise any of oil, glycol, water/glycol, or other hydraulic fluid into and out of the hydraulic device. In some examples, fluid can to flow to and/or from a separate reservoir or source. For example, pressurized fluid from an accumulator can be used to operate the hydraulic device 210 as a starter motor as described above and below. Alternatively, some examples use a large housing that can accommodate enough fluid for operation and cooling. In some examples, the ports 220A, 220B, 224A, 224B, 224C and 224D can variously be used to engage and disengage the plurality of vanes 230 with the ring 226 and to drive, restrain (via the retainers 236 or another locking mechanism) and release the plurality of vanes 230 relative to the rotor 228. One example of vane retraction or release is set forth in U.S. Patent Application Publication No. 2006/0133946, commonly assigned and incorporated herein by reference. Release of the plurality of stepped vanes will result in the operation of the hydraulic device 210 as a couple, motor and/or as a hydraulic pump as is discussed in further detail in one or more of the previously incorporated references. Hydraulic pressure to various of the ports and cavities (further illustrated in FIGS. 6A and 6B) can be controlled through pressure regulators, poppet valves or other known methods. Control of pressure in the hydraulic device 210 can be affected by, for example, controlling a balanced piston as described in U.S. Patent Application Publication No. 2013/00067899.

The shaft 216 can be provided with torque as a result of the worked hydraulic fluid in the vane extended mode of operation. The operation modes can be controlled, for example, via a fluid signal transmitted to the hydraulic device 210 via an inlet/port (e.g., one or more of the ports 224A, 224B, 224C and 224D or another port). For example, the input shaft 216 can be coupled to a torque source (e.g. an engine, motor, or the like) as previously illustrated and described. During starter motor mode of operation, the hydraulic fluid pressurized using energy from a source such as an accumulator (FIGS. 1-2A) can be used to extend the vanes 230, causing the torque source turn over.

As shown in FIGS. 4C-5, the vanes 230 can be configured to received rollers 240 at the outer radial end portion thereof. The rollers 240 can be configured for contact with the ring 226 in the vane extended position. Construction of the rollers 240 is described in, for example, U.S. patent application Ser. No. 16/491,112, which is incorporated herein by reference in its entirety.

The vanes 230 can also have a different construction then those illustrated herein and can be configured variously as step vanes such as those of U.S. patent application Ser. No. 16/491,112, intra-vane design or another design as known in the art and previously described in various of my prior applications that have been incorporated by reference herein.

FIGS. 6A and 6B show portions of the hydraulic vane device 210 schematically. In particular, FIGS. 6A and 6B show the ring 226 in isolation from other components such as the rotor 228 and the plurality of vanes 230. FIGS. 6A and 6B additionally illustrate an inner radial surface 248 of the ring 226, a first cam ring 250A and a second cam ring 250B that can be part of a first and second thrust roller bearing, for example. The inner radial surface 248 (along the rotor) define the working cavity 252 for hydraulic fluid between the ring 226 and rotor 228 as previously discussed.

As shown in FIG. 6A, the ring 226 can include at least one suction cavity 254 and at least one pressure cavity 256. The at least one suction cavity 254 can comprise a first cavity or passage of the ring 226 and can be separate from the at least one pressure cavity 256. The at least one pressure cavity 256 can comprise a second cavity or passageway of the ring 226. The ring 226 can also include a suction port 258 and a pressure port 260. The cavities 254, 256 and the ports 258 and 260 are also shown in FIG. 4C, for example. These ports (suction port 258 and pressure port 260) allow communication of hydraulic fluid to or from the working cavity 252 as operational criteria dictate. Within the working cavity 252 the hydraulic fluid can be worked by the plurality of vanes 230 (FIGS. 4-4C) as previously discussed.

The at least one suction cavity 254 and the at least one pressure cavity 256 can be configured for ingress and egress of the hydraulic fluid through the ring 226. Put another way, the at least one suction cavity 254 and the at least one pressure cavity 256 can be configured as passageways. As shown in FIGS. 6A and 6B, the at least one suction cavity 254 and the at least one pressure cavity 256 can be defined entirely by the ring 226 and do not communicate and are not defined by, for example, the first and second side plates previously illustrated in FIG. 4. Rather, the at least one suction cavity 254 and the at least one pressure cavity 256 can be spaced from the first and second side plates.

The suction port 258 and/or the pressure port 260 can be defined entirely by the ring 226. The suction port 258 can be in fluid communication with the at least one suction cavity 254. The suction port 258 can be configured to receive hydraulic fluid from a first region (e.g., a first part of the working cavity 252) defined between the ring 226 and the rotor 228 (FIG. 4C). Similarly, the pressure port 260 can be in fluid communication with the at least one pressure cavity 256. The pressure port 260 can be configured to allow for passage of the hydraulic fluid from the at least one pressure cavity 256 to a second region (e.g., a second part of the working cavity 252) defined between the ring 226 and the rotor 228 (FIG. 4C).

As shown in FIG. 4C, the suction port 258 can comprise at least two suction ports including a first suction port 258A and a second suction port 258B. The first suction port 258A can be positioned on substantially an opposing side of an inner radial surface 248 of the ring 226 from the second suction port 258B. Similarly, the pressure port 260 can comprise at least two pressure ports spaced from the two suction ports. The at least two pressure ports can include a first pressure port 260A and a second pressure port 260B. The first pressure port 260A can be positioned on substantially an opposing side of the inner radial surface 248 of the ring 226 from the second pressure port 260B.

As shown in FIG. 6A, the at least one pressure cavity 256 can have an inlet 262 thereto defined by the ring 226. The at least one pressure cavity 256 can be divided into two or more sections including a first pressure section 256A that can connect with the first pressure port 260A and a second pressure section 256B that can connect with the second pressure port 260B. The at least one suction cavity 254 can have an outlet 264 thereto defined by the ring 226. The at least one suction cavity 254 can be divided into two or more sections including a first suction section 254A that connects with the first suction port 258A and a second suction section 254B that connects with the second suction port 258B.

As shown in FIGS. 6A and 6B, one of the first pressure section 256A or the first suction section 254A can be configured to split or branch to pass around the other of the first pressure section 256A or the first suction section 254A.

The configuration of the hydraulic vane device 210 can reduce the axial length of the hydraulic vane device 210 relative to previously disclosed hydraulic vane devices. Thus, an entire axial length of the ring 226 can be between 75 mm and 125 mm, for example. However, the axial length can change based upon criteria like shaft diameter, vehicle operational criteria (torque requirement), etc. The axial length of the hydraulic vane device 210 can be reduced by between about 75 mm and about 90 mm relative to these previously disclosed hydraulic vane devices. It should be noted that a width of the ring 226 in the radial direction can be maintained the same as that of the previously disclosed hydraulic vane devices.

As used herein, the term "substantially" "about" "generally" or the like means within +/−10 percent or +/−10 degrees of the value provided.

Although specific configurations of the systems shown in FIGS. 1-8 and particularly described above, other system designs that fall within the scope of the claims are anticipated. For example, the systems discussed could be combined or operated in slightly different manners than as illustrated.

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls. In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

The invention claimed is:

1. A hydraulic device comprising:

a rotor disposed for rotation about an axis;

a plurality of vanes, each of the plurality of vanes moveable relative to the rotor between a retracted position and an extended position where the plurality of vanes work a hydraulic fluid introduced adjacent the rotor; and a ring disposed around at least a portion of the rotor, the ring comprising:

a suction cavity and a pressure cavity, wherein the suction cavity and pressure cavity are configured for ingress and egress of a hydraulic fluid through the ring;

a suction port defined entirely by the ring and in fluid communication with the suction cavity, wherein the suction port is configured to receive hydraulic fluid from a first region between the ring and the rotor; and a pressure port defined entirely by the ring and in fluid communication with the pressure cavity, wherein the pressure port is configured to allow for passage of the hydraulic fluid from the pressure cavity to a second region between the ring and the rotor.

2. The hydraulic device of claim 1, further comprising a first end plate and a second end plate, wherein the first end plate is coupled to a first axial side of the ring and the second end plate is coupled to a second opposing side of the ring, wherein the suction cavity and the pressure cavity are defined entirely by the ring and are spaced from the first end plate and the second end plate of the hydraulic device.

3. The hydraulic device of claim 2, further comprising a valve assembly mounted to the ring and positioned adjacent and between the first end plate and the second end plate, wherein the valve assembly is in fluid communication with the pressure cavity and is configured to regulate the hydraulic fluid to the pressure cavity.

4. The hydraulic device of claim 1, further comprising:

a first thrust bearing disposed adjacent a first axial end of the rotor; and a second thrust bearing disposed adjacent a second axial end of the rotor, the second axial end opposing the first axial end.

5. The hydraulic device of claim 1, wherein the suction cavity and the pressure cavity are defined entirely by the ring.

6. The hydraulic device of claim 1, wherein the suction port comprises two suction ports including a first suction port and a second suction port, wherein the first suction port is positioned on substantially an opposing side of an inner diameter surface of the ring from the second suction port, and wherein the pressure port comprises two pressure ports spaced from the two suction ports, the two pressure ports including a first pressure port and a second pressure port, wherein the first pressure port is positioned on substantially an opposing side of the inner diameter surface of the ring from the second pressure port.

7. The hydraulic device of claim 6, wherein the pressure cavity has a single inlet thereto defined by the ring and is divided into two sections including a first pressure section that connects with the first pressure port and a second pressure section that connects with the second pressure port, and wherein the suction cavity has a single outlet thereto defined by the ring and is divided into two sections including a first suction section that connects with the first suction port and a second suction section that connects with the second suction port.

8. The hydraulic device of claim 7, wherein one of the first pressure section or the first suction section splits to pass around the other of the first pressure section or the first suction section.

9. The hydraulic device of claim 1, further comprising a plurality of rollers, wherein each of the plurality of rollers is coupled to a respective one of the plurality of vanes at an outer end portion thereof.

10. The hydraulic device of claim 1, wherein the plurality of vanes is configured having one of an intra vane clamp assembly, a push pin assembly or a step vane.

11. The hydraulic device of claim 1, wherein, when viewed in cross-section, the ring is one of substantially square or rectangular shape as defined by an outer surface thereof.

12. The hydraulic device of claim 11, wherein the ring has a plurality of ports in the outer surface positioned on at least two sides of the outer surface.

13. The hydraulic device of claim 1, wherein an entire axial length of the ring is between 75 mm and 125 mm.

14. A system comprising:

a hydraulic device, the hydraulic device comprising:

a rotor disposed for rotation about an axis;

a plurality of vanes, each of the plurality of vanes moveable relative to the rotor between a retracted position and an extended position where the plurality of vanes work a hydraulic fluid introduced adjacent the rotor; and a ring disposed at least partially around the rotor, the ring comprising:

suction cavity and pressure cavity, wherein the suction cavity and pressure cavity are configured for ingress and egress of a hydraulic fluid through the ring;

a suction port defined entirely by the ring and in fluid communication with the suction cavity, wherein the suction port is configured to receive hydraulic fluid from a first region between the ring and the rotor; and a pressure port defined entirely by the ring and in fluid communication with the pressure cavity, wherein the pressure port is configured to allow for passage of the hydraulic fluid from the pressure cavity to a second region between the ring and the rotor;

a torque generating device coupled to one of the rings or the rotor; and an energy storage device in fluid communication with the hydraulic device, wherein the hydraulic fluid is selectively operable as a starter motor for the torque generating device using the hydraulic fluid supplied from the energy storage device.

15. The system of claim 14, wherein energy storage device comprises an accumulator.

16. The system of claim 14, further comprising a first end plate and a second end plate, wherein the first end plate is coupled to a first axial side of the ring and the second end plate is coupled to a second opposing side of the ring, wherein the suction cavity and the pressure cavity are defined entirely by the ring and are spaced from the first end plate and the second end plate of the hydraulic device.

17. The system of claim 14, further comprising a valve assembly in fluid communication with the pressure cavity and is configured to regulate the hydraulic fluid to the pressure cavity.

18. The system of claim 14, further comprising a controller operable to control a system operation mode based on a plurality of vehicle operation parameters.

19. The system of claim 18, wherein the system operation mode includes operating the hydraulic device as one of a hydraulic coupling or vane pump in addition to the starter motor, and wherein the system operation mode comprises controlling the hydraulic device and one or more accessories that can include the energy storage device in one or more of an accessory operation mode, a vehicle idle/drive mode, a regenerative energy storage mode, a regenerative energy application mode, a vane pumping mode and a startup mode.

20. The system of claim 19, wherein a fluid communicating interior portion of the hydraulic device and the one or more accessories are coated in a diamond or diamond-like carbon, and wherein the hydraulic fluid comprises glycol or water-glycol.

* * * * *